US009615694B2

(12) United States Patent
Yoshidome

(10) Patent No.: US 9,615,694 B2
(45) Date of Patent: Apr. 11, 2017

(54) HEATING COOKER

(71) Applicant: SHARP KABUSHIKI KAISHA, Osaka-shi, Osaka (JP)

(72) Inventor: Akihiro Yoshidome, Osaka (JP)

(73) Assignee: SHARP KABUSIHIKI KAISHA, Osaka (JP)

( * ) Notice: Subject to any disclaimer, the term of this patent is extended or adjusted under 35 U.S.C. 154(b) by 108 days.

(21) Appl. No.: 14/430,479

(22) PCT Filed: Nov. 29, 2013

(86) PCT No.: PCT/JP2013/082143
§ 371 (c)(1),
(2) Date: Mar. 23, 2015

(87) PCT Pub. No.: WO2014/084335
PCT Pub. Date: Jun. 5, 2014

(65) Prior Publication Data
US 2015/0201806 A1    Jul. 23, 2015

(30) Foreign Application Priority Data

Nov. 30, 2012 (JP) ................................. 2012-263499

(51) Int. Cl.
*A47J 37/10* (2006.01)
*A47J 27/00* (2006.01)
*A47J 37/06* (2006.01)

(52) U.S. Cl.
CPC ............. *A47J 37/10* (2013.01); *A47J 27/004* (2013.01); *A47J 37/0641* (2013.01)

(58) Field of Classification Search
USPC .......................................... 99/447
See application file for complete search history.

(56) References Cited

U.S. PATENT DOCUMENTS

| 5,605,090 A | * | 2/1997 | Mantani | A21B 7/005 366/146 |
| 5,860,355 A | * | 1/1999 | Takeda | A21B 7/005 366/146 |

(Continued)

FOREIGN PATENT DOCUMENTS

| JP | 02-019113 A | 1/1990 |
| JP | 04-300509 A | 10/1992 |

(Continued)

*Primary Examiner* — Quang D Thanh
*Assistant Examiner* — Renee Larose
(74) *Attorney, Agent, or Firm* — Birch, Stewart, Kolasch & Birch, LLP

(57) ABSTRACT

A heating cooker is provided with: a container for housing food; a housing unit for housing the container; a discharge port for discharging air in the lateral direction towards the inside of the housing unit, the discharge port being provided at the upper part of a side wall of the housing unit; outlet ports through which air in the housing unit flows out, the outlet ports being provided to the housing unit; an airflow duct communicating the outlet ports and the discharge port to each other; an airflow fan for channeling air flowing into the airflow duct towards the discharge port; and a duct heater, which is a heating unit for heating the air channeled into the airflow duct.

4 Claims, 7 Drawing Sheets

(56) References Cited

U.S. PATENT DOCUMENTS

| | | | | |
|---|---|---|---|---|
| 5,934,177 A | * | 8/1999 | Takeda | A21B 7/005 366/146 |
| 6,186,053 B1 | * | 2/2001 | Nakano | A21B 7/005 366/146 |
| 2003/0140796 A1 | * | 7/2003 | Wang | A21B 7/005 99/326 |
| 2006/0117961 A1 | * | 6/2006 | Guo | A21B 7/005 99/348 |
| 2007/0034091 A1 | * | 2/2007 | Fukumori | A47J 37/00 99/348 |

FOREIGN PATENT DOCUMENTS

| | | | |
|---|---|---|---|
| JP | 07-12335 B2 | | 2/1995 |
| JP | 2703991 | * | 1/1998 |
| JP | 2703991 B2 | | 1/1998 |
| JP | H02307411 | * | 1/1998 |
| JP | 2003-265324 A | | 9/2003 |

* cited by examiner

HEATING COOKER

TECHNICAL FIELD

The present invention relates to a heating cooker that cooks an object to be heated.

BACKGROUND ART

A conventional heating cooker is disclosed in Patent Literature 1. This conventional heating cooker includes a container that accommodates food as an object to be heated, a housing unit in which the container is housed, a lid that is openable/closable with respect to upper-surface openings of the container and of the housing unit, an airflow fan that forces heated air into the container, and a heating unit. The container has a shape of a so-called frying pan and is circular in plan view, and it has therein a stirrer member configured to rotate in a horizontal plane along an inner bottom surface of the container to stir food.

This heating cooker cooks food by forcing heated air into the container while rotating the stirrer member. This enables cooking to be performed with a small amount of oil, which helps save oil, shorten cooking time, make cleaning simple, and avoid risk of using a large amount of oil.

CITATION LIST

Patent Literature

[Patent Literature 1] WO2006/000700

SUMMARY OF INVENTION

Technical Problem

However, in the conventional heating cooker described in Patent Literature 1, air forced to flow by the airflow fan disposed in a main body flows through a duct in the lid, to be discharged through a discharge port provided inside the lid downward through the upper surface opening of the container. The duct is formed inside the lid so as to extend from an outer side to an inner side, in a diameter direction, of the container which is circular in plan view. That is, air that is forced by the airflow fan to flow flows from the main body side toward the lid. Thus, there is a high possibility of air heated for cooking flowing out through a gap between the main body and the lid, and thus the conventional heating cooker may disadvantageously suffer from degradation of heating efficiency.

Further, the provision of the duct in the lid makes the structure of the lid complicated, and an increased number of members are required to form the duct. This causes a problem of, for example, increase in cost and number of production steps. Furthermore, if higher heat resistance is required of the structure of the duct, it may disadvantageously cause further increase in cost.

The present invention has been made in view of the above problems, and an object of the present invention is to provide a heating cooker capable of improving heating efficiency while reducing increase in cost.

Solution to Problem

To achieve the above object, according to one aspect of the present invention, a heating cooker includes a container an upper surface of which is open, and that accommodates an object to be heated, a housing unit for the container, an upper surface of the housing unit being openable/closable with a lid, a discharge port that is disposed in an upper portion of a side wall of the housing unit, and that discharges air laterally toward an inside of the housing unit, an outlet port that is disposed in the housing unit, and through which air inside the housing unit flows out of the housing unit, an airflow duct that allows the outlet port and the discharge port to communicate with each other, an airflow fan that forces air flown into the airflow duct to flow toward the discharge port, and a heating unit that heats air flowing through the airflow duct.

According to this configuration, air forced by the airflow fan to flow inside the airflow duct is laterally discharged from the upper portion of the side wall of the housing unit toward the inside of the housing unit. This reduces the possibility of air heated for cooking flowing out through a gap between a main body and the lid. Furthermore, there is no need of providing a duct inside the lid. Accordingly, such material as would be necessary to form a duct inside the lid can be omitted, and thus it is possible to reduce increase in cost and number of production steps.

In the heating cooker configured as described above, the discharge port may be disposed above an upper end of the container.

The heating cooker configured as described above may further include an airflow guide panel that directs air discharged from the discharge port downward in the container.

In the heating cooker configured as described above, the outlet port may be disposed above the upper end of the container.

In the heating cooker configured as described above, the airflow guide panel may be disposed inside the lid.

In the heating cooker configured as described above, the container may be detachable/attachable with respect to the housing.

The heating cooker configured as described above may further include a stirrer unit that is configured to stir the object to be heated.

In the heating cooker configured as described above, the stirrer unit may be a drive unit that is configured to directly rotate the container.

In the heating cooker configured as described above, an inner bottom surface of the container may be inclined with respect to the horizontal.

Advantageous Effects of Invention

According to the present invention, it is possible to provide a heating cooker capable of improving heating efficiency while reducing increase in cost.

DESCRIPTION OF EMBODIMENTS

Hereinafter, embodiments of the present invention will be described with reference to FIG. 1 to FIG. 7.

<First Embodiment>

Figure 1:
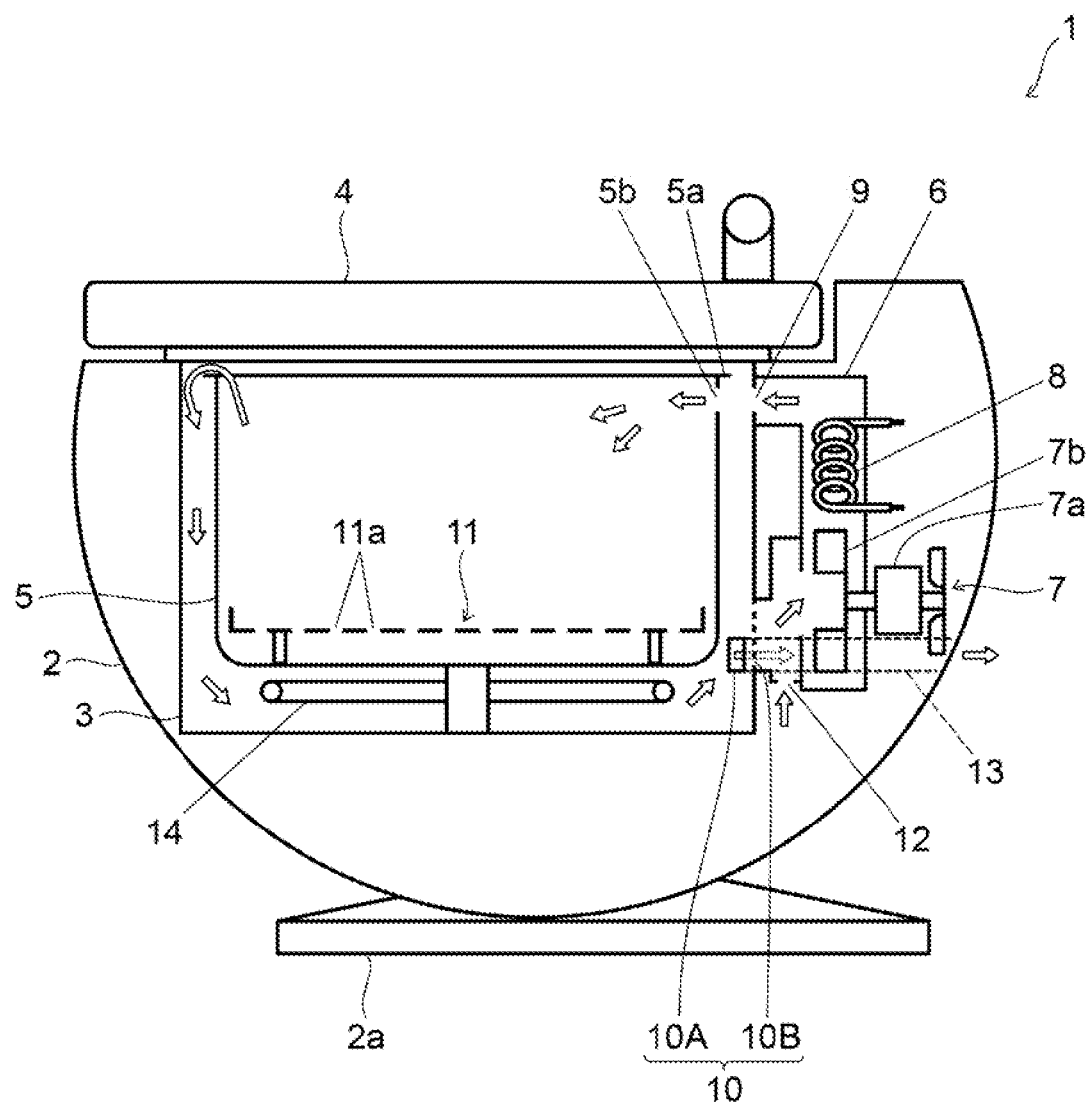
FIG. 1 is a schematic vertical sectional side view of a heating cooker according to a first embodiment of the present invention.
Figure 2:
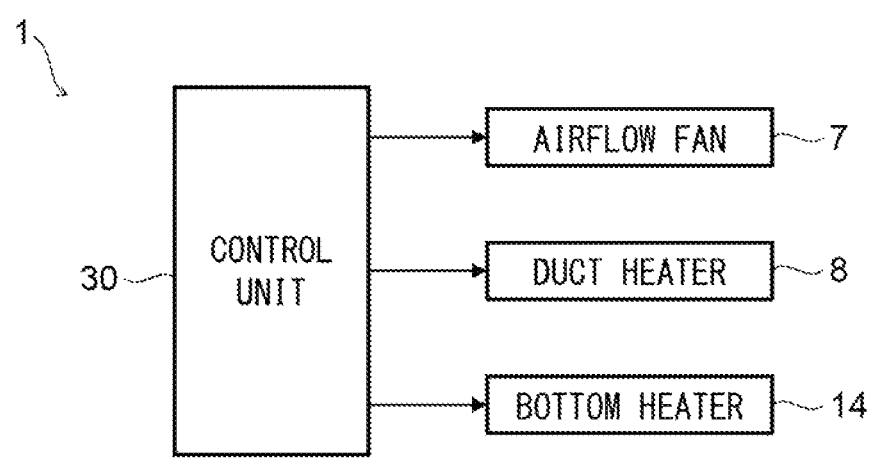
FIG. 2 is a block diagram showing a configuration of the heating cooker according to the first embodiment of the present invention.

First, descriptions will be given of a heating cooker according to a first embodiment of the present invention, referring to FIG. 1 and FIG. 2, focusing on a structure and heating operation of the heating cooker. FIG. 1 is a schematic vertical sectional side view of the heating cooker, and FIG. 2 is a block diagram showing a configuration of the heating cooker. Note that white arrows in FIG. 1 show a passage along which air flows and a direction in which air flows.

The heating cooker 1 includes a main body case 2 having, as shown in FIG. 1, a hemispherical external shape that has a curved surface in a lower portion thereof, and the main body case 2 includes a housing unit 3, a lid 4, a container 5 configured to accommodate food as an object to be heated, an airflow duct 6, an airflow fan 7, and a duct heater 8 as a heating unit.

An upper surface of the main body case 2 is constituted by a horizontal flat surface, and the housing unit 3 in the main body case 2 is formed as a depressed portion depressed downward from the upper surface. The housing unit 3 is a depressed portion that is circular in plan view and an upper surface of which is open, and this upper surface is operable/closable with the lid 4. The container 5 is put in the housing unit 3 through the upper surface opening of the housing unit 3. The main body case 2 is supported by a stand 2a with a curved external bottom portion of the main body case 2 supported on the stand 2a which is in contact with a floor surface.

The housing unit 3 is provided with a discharge port 9 and an outlet port 10 in a side wall thereof. The discharge port 9 is an opening formed in an upper portion of a side wall of the housing unit 3, and air is laterally discharged from the discharge port 9 toward an inside of the housing unit 3. The outlet port 10 is an opening formed in a lower portion of the side wall of the housing unit 3, and air inside the housing unit 3 flows out through the outlet port 10.

The outlet port 10 includes two outlet ports 10 provided at two positions. One of the two outlet ports 10 is an external outlet port 10A which is open with respect to an exhaust duct 13 that communicates with an outside of the main body case 2. Thereby, part of air inside the housing unit 3 is emitted to the outside of the main body case 2 through the exhaust duct 13. The other of the two outlet ports 10 is a circulation inlet port 10B which is open with respect to the airflow duct 6 such that part of air inside the housing unit 3 returns to an upstream side of the later-described airflow fan 7 in the airflow duct 6 with respect to an airflow direction. Thereby, part of air inside the housing unit 3 circulates via the circulation inlet port 10B. Here, the outlet port 10 may be disposed at one single position such that one airflow path for emitting air to the outside of the main body case 2 and another airflow path for returning air to the upstream side of the airflow fan 7 with respect to the airflow direction branch off from the outlet port 10.

The container 5 has a cookpot-like shape that is circular in plan view and an upper surface of which is open. The container 5 is housed in the inside of the housing unit 3, and is fixed to an inner bottom surface of the housing unit 3. Food is to be put in the container 5 as an object to be heated. The container 5 is provided with a substantially annular flange portion 5a along a rim of its opening. The container 5 is further provided with a window portion 5b which is formed in a side wall of the container 5. The window portion 5b is an opening formed at a position in an upper portion of the side wall corresponding to the discharge port 9. Thereby, air laterally discharged from the discharge port 9 toward the inside of the housing unit 3 flows through the window portion 5b into the container 5.

Here, a tray 11 may be placed inside the container 5. The tray 11 is provided with a plurality of through holes 11 a to allow air to easily circulate between above and below the tray 11.

The airflow duct 6 is disposed inside the main body case 2 but outside the housing unit 3. The airflow duct 6 is provided with an inlet port 12 through which to take in air from the outside of the main body case 2. The airflow duct 6 allows the inlet port 12 and the circulation inlet port 10B of the outlet port 10 to communicate with the discharge port 9. The airflow fan 7 is disposed in the airflow duct 6.

The airflow fan 7 is a sirocco fan, for example, including a fan motor 7a and an impeller 7b driven by the fan motor 7a. The impeller 7b is disposed inside the airflow duct 6 such that an unillustrated air inlet portion of the impeller 7b faces the inlet port 12 and the circulation inlet port 10B-side of the outlet port 10. When the impeller 7b is driven to rotate by the fan motor 7a, air flows in the airflow duct 6. That is, the airflow fan 7 forces air flown into the airflow duct 6 from the inlet port 12 and the circulation inlet port 10B to flow through the airflow duct 6 toward the discharge port 9. Here, although the airflow fan 7 is a sirocco fan in the present embodiment, the airflow fan 7 may be of any other type including a propeller fan and a turbofan.

The duct heater 8 is disposed inside the airflow duct 6, at a position downstream side of the airflow fan 7 and upstream side of the discharge port 9 with respect to the airflow direction. The duct heater 8 is constituted as a coil, for example, for heating air flowing in the airflow duct 6. Note that the heating method of the duct heater 8 is not necessarily limited to a coil, and air flowing in the airflow duct 6 may be heated otherwise.

Furthermore, the heating cooker 1 also includes a bottom heater 14 disposed at a bottom portion of the housing unit 3. The bottom heater 14 is disposed between the inner bottom surface of the housing unit 3 and an outer bottom surface of the container 5 such that the bottom heater 14 directly heats the bottom portion of the container 5 to thereby conduct heat to food put in the container 5.

Furthermore, as shown in FIG. 2, for the purpose of controlling operations of the heating cooker 1, a control unit 30 is provided in the main body case 2. The control unit 30 is constituted by an arithmetic unit, a storage unit, and other electronic components, which are not illustrated; the control unit 30 controls the airflow fan 7, the duct heater 8, and the bottom heater 14 according to programs and data stored and input in the storage unit, for example, and thereby achieves a series of cooking operation.

In the heating cooker 1 configured as described above, when an instruction is given via an unillustrated operation unit to start cooking, the airflow fan 7, the duct heater 8, and the bottom heater 14 are driven. Thereby, airflow is generated and forced to flow through the airflow duct 6 toward the discharge port 9 from the inlet port 12 and the circulation inlet port 10B.

Air inside the airflow duct 6 is heated by the duct heater 8 to a temperature between 40 and 230° C., for example. The air heated by the duct heater 8 is laterally discharged from the discharge port 9 toward the inside of the housing unit 3. The air discharged from the discharge port 9 flows into the container 5 via the window portion 5b, and heats food placed in the container 5 as an object to be heated. It is also possible to heat food in the container 5 with the bottom heater 14 via the bottom portion of the container 5.

Air flown in the inside of the container 5 is forced to flow over the flange portion 5a provided along the rim of the container 5 into a gap outside the container 5 between the container 5 and the housing unit 3. Air forced to flow into the gap between the container 5 and the housing unit 3 flows through the outlet port 10 to the outside of the housing unit 3. Air flown through the outlet port 10 to the outside of the housing unit 3 is partly emitted to the outside of the main body case 2 through the exhaust duct 13, and partly flows through the airflow duct 6 to be reused to heat the food.

Here, if heated hot airflow is completely emitted to the outside of the heating cooker 1, and air taken in anew from the outside is heated from the beginning, there is a concern that heating efficiency might be disadvantageously degraded. Thus, in the heating cooker 1, hot airflow is basically circulated inside the main body case 2. And, for adjustment of humidity inside the housing unit 3, part of the circulating hot airflow is replaced with outside air by taking in air from the outside and discharging part of heated air to the outside.

<Second Embodiment>

Figure 3:
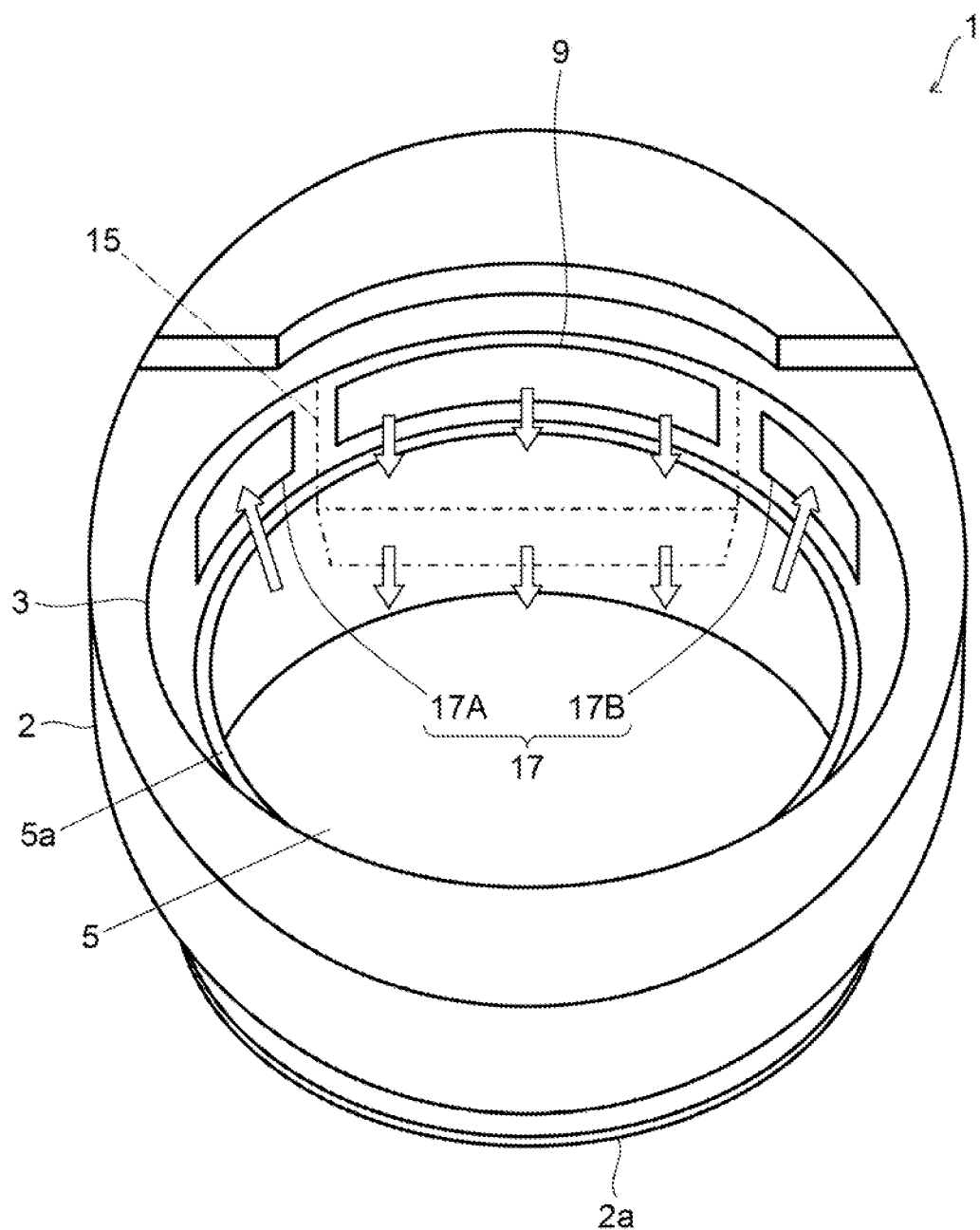
FIG. 3 is an external perspective view of a heating cooker according to a second embodiment of the present invention as seen from obliquely above a front portion of the heating cooker.
Figure 4:
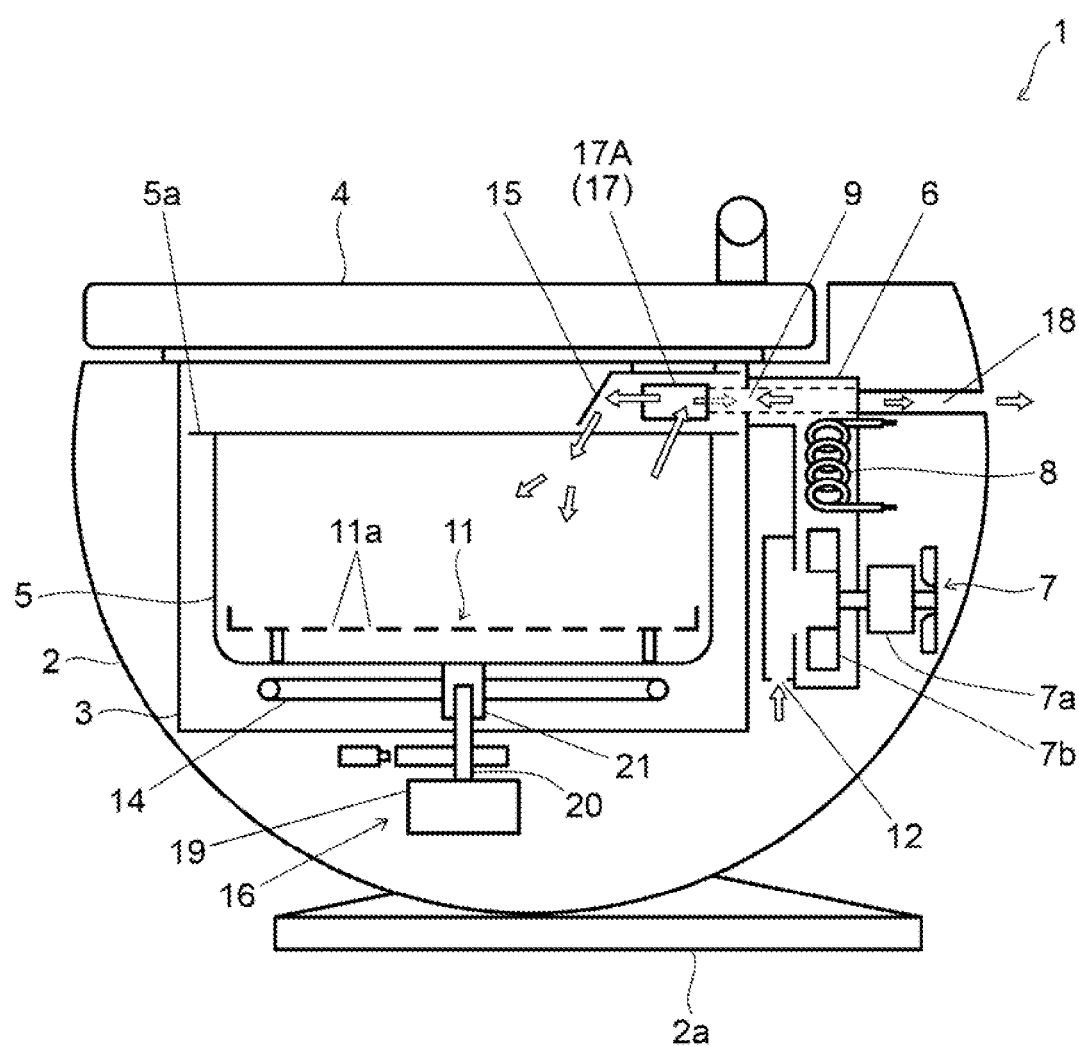
FIG. 4 is a schematic vertical sectional side view of the heating cooker according to the second embodiment of the present invention.
Figure 5:
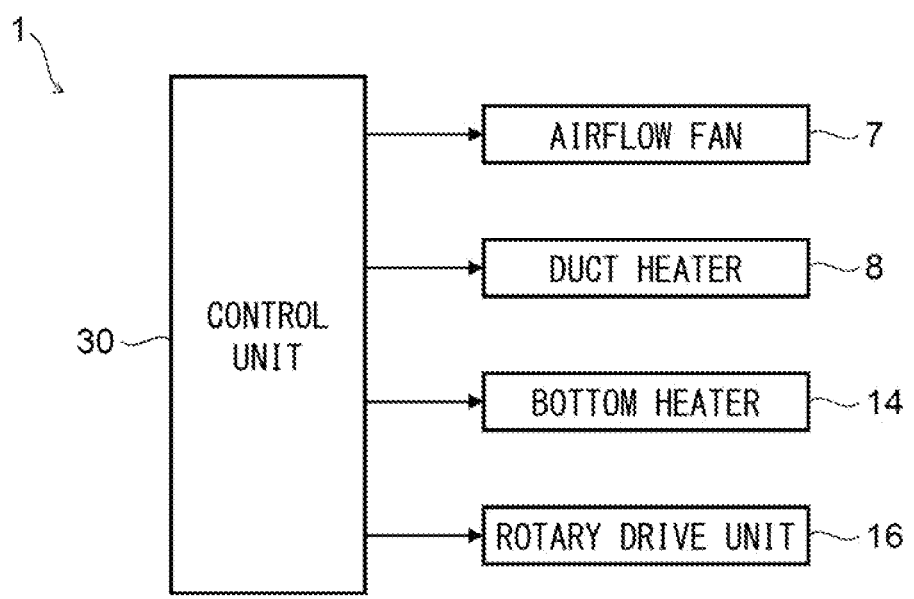
FIG. 5 is a block diagram showing a configuration of the heating cooker according to the second embodiment of the present invention.

Next, a heating cooker according to a second embodiment of the present invention will be described with reference to FIGS. 3 to 5. FIG. 3 is an external perspective view of the heating cooker as seen from obliquely above a front portion of the heating cooker, FIG. 4 is a schematic vertical sectional side view of the heating cooker, and FIG. 5 is a block diagram showing a configuration of the heating cooker. The basic configuration of the present embodiment is the same as that of the first embodiment described with reference to FIGS. 1 and 2, and thus such components as are common to both the first embodiment and the present embodiment are identified with the same reference signs as those used in the first embodiment, and illustration thereof in the figures and descriptions thereof will be omitted. In FIG. 3, the lid 4 and the tray 11 are not illustrated.

The heating cooker I according to the second embodiment includes the main body case 2 having a hemispherical shape as shown in FIGS. 3 and 4, and the main body case 2 includes the housing unit 3, the lid 4, the container 5, the airflow duct 6, the airflow fan 7, the duct heater 8, an airflow guide panel 15, and a rotary drive unit 16.

The housing unit 3 is provided with the discharge port 9 and an outlet port 17 both formed in its side wall. The discharge port 9 is an opening formed in an upper part of the side wall of the housing unit 3, and air is laterally discharged from the discharge port 9 toward the inside of the housing unit 3. The outlet port 17 is open on both sides of the discharge port 9 in a circumferential direction in an upper part of the side wall of the housing unit 3 (see FIG. 3), and air inside the housing unit 3 flows out through the outlet port 17.

The outlet port 17 is provided at two positions. The outlet port 17 provided at one position is an external outlet port 17A which is open with respect to an exhaust duct 18 that communicates with the outside of the main body case 2. Thereby, part of air inside the housing unit 3 is emitted to the outside of the main body case 2 through the exhaust duct 18. The outlet port 17 provided at the other position is a circulation inlet port 17B which is open with respect to the airflow duct 6 such that part of air inside the housing unit 3 returns to the upstream side of the airflow fan 7 in the airflow duct 6 with respect to the airflow direction. Thereby, part of air inside the housing unit 3 circulates via the circulation inlet port 17B. Here, the outlet port 17 may be provided at one single position such that one circulation path for emitting air to the outside of the main body case 2 and another circulation path for returning air to the upstream side of the airflow fan 7 with respect to the air circulation direction branch off from the outlet port 17.

The container 5 has a cookpot-like shape that is circular in plan view and an upper surface of which is open. The container 5 is disposed in the housing unit 3 and formed to have a shape and a size such that the rim of the container 5 is located below that of the housing unit 3 when in the housing unit 3. And the discharge port 9 and the outlet port 17 are located above an upper end of the container 5. No such window portion as has been described in relation to the first embodiment is not provided in the container 5 of the present embodiment.

The airflow guide panel 15 is disposed on an inside of the lid 4, that is, on the housing unit 3 side of the lid 4 such that it is located inside the housing unit 3 when the lid 4 is closed with respect to the housing unit 3. The airflow guide panel 15 has a flat panel shape, for example, and formed to be located at a position corresponding to the discharge port 9 so as to extend from an outer side to an inner side in a diameter direction of the container 5. An inner end portion of the airflow guide panel 15 in the diameter direction of the container 5 is bent downward at a predetermined angle. Here, the place to dispose the airflow guide panel 15 is not limited to the inside of the lid 4, and it may be disposed in the housing unit 3.

The rotary drive unit 16 is disposed in a lower portion of the main body case 2, that is, specifically, at a position below the housing unit 3, corresponding to a center portion of the container 5 in the diameter direction of the container 5. The rotary drive unit 16 includes a motor 19 and an unillustrated reduction gear. The reduction gear is not an indispensable component of the rotary drive unit 16, and it may be omitted. A rotary shaft 20, which receives rotary power from the motor 19, is disposed at a position corresponding to a center of the container 5 in its diameter direction, and extends upward in a substantially vertical direction. The rotary drive unit 16 is capable of rotating the container 5 in a horizontal plane about the rotary shaft 20 by driving the motor 19.

That is, the rotary drive unit 16 functions as a stirrer unit that stirs food by directly rotating the container 5. The stirrer unit may be constituted as, for example, a stirring blade configured to rotate independently of the container 5 to stir food.

At a position at a center of the outer bottom surface of the container 5 in its diameter direction and corresponding to an upper end of the rotary shaft 20, a coupling 21 is provided. Via the coupling 21, the container 5 and the rotary shaft 20 are detachably/attachably coupled to each other. Thereby, it is possible to detach the container 5 from the housing unit 3 and take it out of the main body case 2.

The control unit 30 is constituted by an arithmetic unit, a storage unit, and other electronic components which are not illustrated; the control unit 30 controls the airflow fan 7, the duct heater 8, the bottom heater 14, and the rotary drive unit 16 according to programs and data stored and input in the storage unit, for example, and thereby achieves a series of cooking operation.

In the heating cooker 1 configured as described above, when an instruction is given via an unillustrated operation unit to start cooking, the airflow fan 7, the duct heater 8, the bottom heater 14, and the rotary drive unit 16 are driven. Thereby, airflow is generated and forced to flow through the airflow duct 6 toward the discharge port 9 from the inlet port 12 and the circulation inlet port 17B.

Air inside the airflow duct 6 is heated by the duct heater 8 to a temperature between 40 and 230° C., for example. The air heated by the duct heater 8 is laterally discharged toward the inside of the housing unit 3 from the discharge port 9 that is disposed above the upper end of the container 5. The air discharged from the discharge port 9 flows from the discharge port 9 to pass above the upper end of the container 5, and hits the airflow guide panel 15, which directs the air toward a lower portion of the inside of the container 5. The air directed downward in the inside of the container 5 by the airflow guide panel 15 flows inside the container 5, and heats food as an object to be heated. It is also possible to heat food with the bottom heater 14 via the bottom portion of the container 5.

When the rotary drive unit 16 is so controlled as to drive the motor 19, the container 5 rotates in a horizontal plane. Thereby, the heating cooker 1 stirs food in the container 5 while heating the food.

The air flown into the container 5 from the discharge port 9 flows from the outlet port 17 disposed above the upper end of the container 5 to the outside of the housing unit 3. The air flown to the outside of the housing unit 3 from the outlet port 17 is partly emitted to the outside of the main body case 2 through the exhaust duct 18, and partly flows through the airflow duct 6 to be reused to heat the food.

<Third Embodiment>

Figure 6:
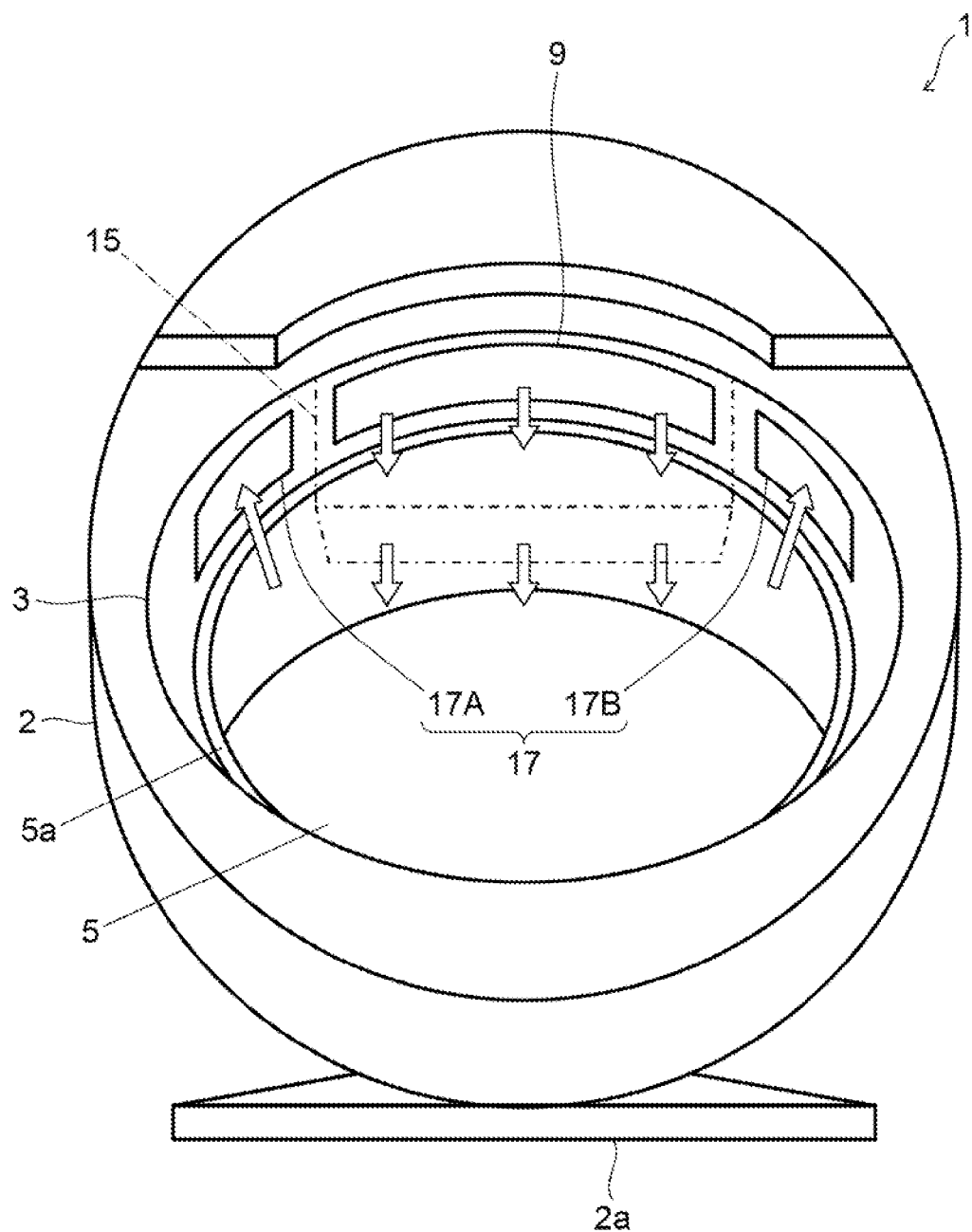
FIG. 6 is an external front view of a heating cooker according to a third embodiment of the present invention.
Figure 7:
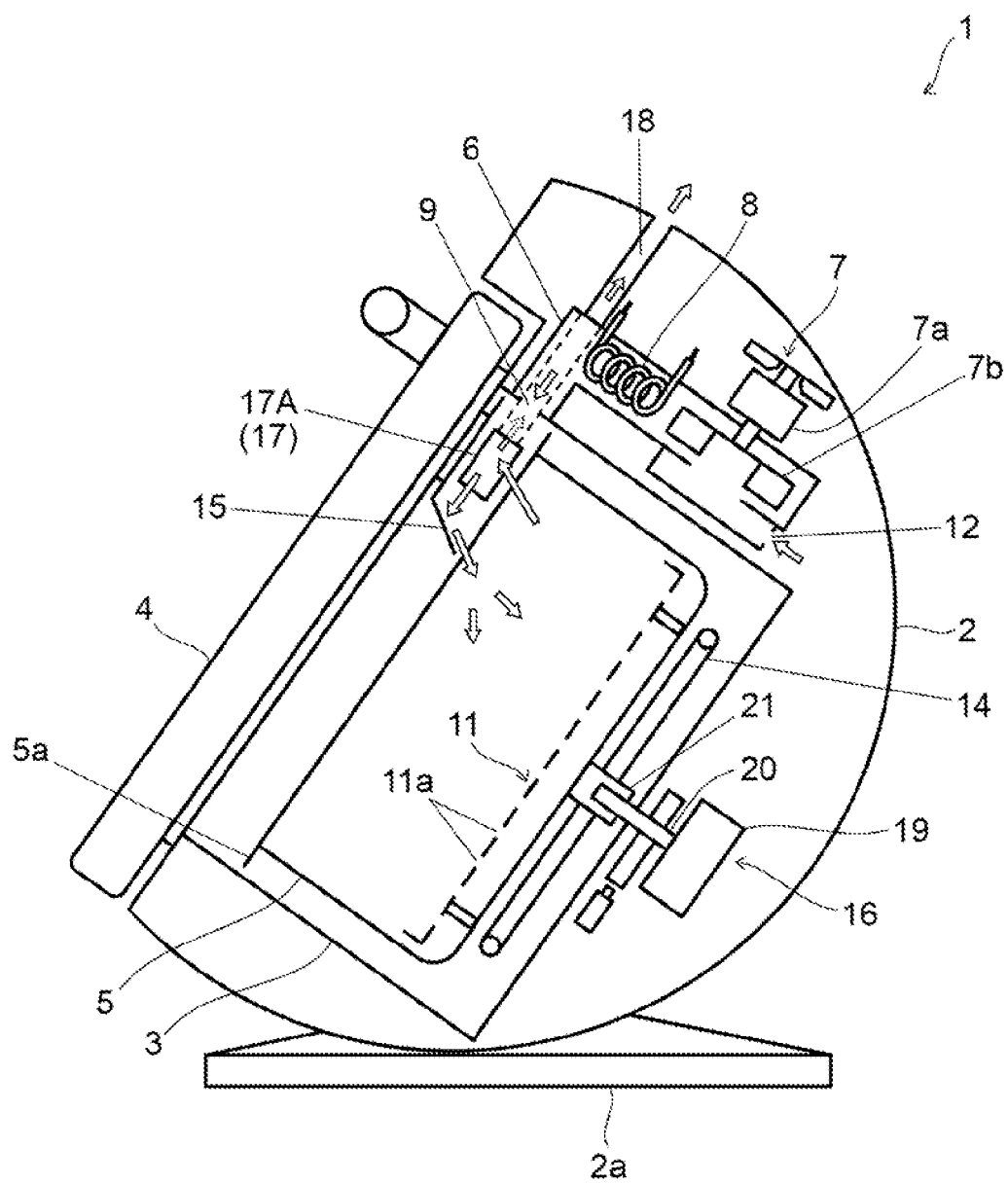
FIG. 7 is a schematic vertical sectional side view of the heating cooker according to the third embodiment of the present invention.

Next, a heating cooker according to a third embodiment of the present invention will be described with reference to FIGS. 6 and 7. FIG. 6 is an external front view of the heating cooker, and FIG. 7 is a schematic vertical sectional side view of the heating cooker. The basic configuration of the present embodiment is the same as that of the first and second embodiments described above, and thus such components as are common to these embodiments are identified with the same reference signs as those used in the first and second embodiments, and illustration thereof in the figures and descriptions thereof will be omitted. In FIG. 6, the lid 4 and the tray 11 are not illustrated.

As shown in FIGS. 6 and 7, the heating cooker 1 of the third embodiment is supported by the stand 2a such that the main body case 2 having a hemispherical shape is inclined with respect to a horizontal plane. A back side (right-hand side in FIG. 7) of the main body case 2 is lifted, so that the main body case 2 is inclined at a predetermined angle such that the upper surface of the main body case 2 faces frontward to some extent. That is, in the heating cooker 1, an inner bottom surface of the container 5 is inclined with respect to the horizontal plane.

Thus, the heating cooker 1 includes the container 5 the upper surface of which is open, and that accommodates food as an object to be heated, the housing unit 3 for the container 5, the upper surface of the housing unit 3 being openable/closable with the lid 4, the discharge port 9 that is formed in the upper portion of the side wall of the housing unit 3, and from which air is laterally discharged toward the inside of the housing unit 3, the outlet ports 10 and 17 that are provided in the housing unit 3, and through which air inside the housing unit 3 flows out of the housing unit 3, the airflow duct 6 that allows the outlet ports 10 and 17 to communicate with the discharge port 9, the airflow fan 7 that forces air flown into the airflow duct 6 to flow toward the discharge port 9, and the duct heater 8 as a heating unit that heats air flowing through the airflow duct 6. Thereby, the air forced by the airflow fan 7 to flow through the inside of the airflow duct 6 is laterally discharged from an upper portion of the side wall of the housing unit 3 toward the inside of the housing unit 3. Thus, it is possible to reduce possibility of leakage of air heated for cooking to leak through a gap between the main body case 2 and the lid 4. As a result, heating efficiency is improved. Furthermore, there is no need of providing a duct inside the lid 4. Accordingly, such material as would be necessary to form such a duct can be omitted, and thus it is possible to reduce increase in cost and number of production steps.

Also, in the heating cooker 1, the discharge port 9 is disposed above the upper end of the container 5. Thereby, it is possible to prevent air discharged from the discharge port 9 from being blocked by the container 5. Thus, it is possible to supply the container 5 with air heated for cooking, without any loss. As a result, heating efficiency is improved.

Also, the heating cooker 1 includes the airflow guide panel 15 that directs the air discharged from the discharge port 9 downward in the container 5. Thereby, it is possible to actively apply heated air to food placed inside the container 5. Thus, it is possible to achieve improved heating efficiency.

Also, in the heating cooker 1, the outlet port 17 is disposed above the upper end of the container 5. Thereby, it is possible to allow air flown inside the container 5 and used for cooking to smoothly flow out of the housing unit 3. Thus, it is possible to generate a preferable flow of air inside the container 5. As a result, heating efficiency is improved.

Also, in the heating cooker 1, the airflow guide panel 15 is disposed on the inside of the lid 4. Thereby, the airflow guide panel 15 can be retreated from the upper surface of the container 5 when the lid 4 is opened. Thus, the airflow guide panel 15 does not hinder cleaning of the inside of the container 5 or removing of the container 5 from the housing unit 3, for example. Thus, it is possible to improve operability as well as heating efficiency.

Furthermore, in the heating cooker 1, the container 5 is detachable/attachable with respect to the housing unit 3. Thereby, it is possible to take the container 5 out of the housing unit 3 to clean the inside of the container 5 or to take cooked food out of the container 5. Thus, it is possible to improve operability as well as heating efficiency.

Furthermore, the heating cooker 1 includes the rotary drive unit 16 as a stirrer unit for stirring food as an object to be heated. Thereby, it is possible to apply heated air uniformly to the food inside the container 5. Thus, it is possible to improve heating efficiency.

Furthermore, in the heating cooker 1, the stirrer unit is the rotary drive unit 16 that directly rotates the container 5. Thereby, food inside the container 5 rotates as a whole. Thus, it is possible to apply heated air uniformly to the whole food inside the container 5. As a result, even more improved heating efficiency is achieved.

In addition, in the heating cooker 1, the inner bottom surface of the container 5 is inclined with respect to a horizontal plane. Thereby, it is possible to effectively prevent unintended maldistribution of food inside the container 5. Thus, it is possible to apply heated air intensively to the whole food inside the container 5. As a result, heating efficiency is further improved.

And according to the configurations of the embodiments of the present invention discussed above, it is possible to provide a heating cooker 1 capable of improving heating efficiency while reducing cost increase.

The foregoing has described the embodiments of the present invention. The present invention, however, is not limited in scope thereto and can be implemented in variously modified forms within the spirit of the invention.

INDUSTRIAL APPLICABILITY

The present invention is applicable to heating cookers.

LIST OF REFERENCE SIGNS

1 heating cooker
2 main body case
3 housing unit
4 lid
5 container
6 airflow duct
7 airflow fan
8 duct heater (heating unit)
9 discharge port
10, 17 outlet port
10A, 17A external outlet port
10B, 17B circulation inlet port (outlet port)
12 inlet port
13, 18 exhaust duct
15 airflow guide panel
16 rotary drive unit (drive unit, stirrer unit)
19 motor
30 control unit

The invention claimed is:

1. A heating cooker, comprising:
   a container, an upper surface of which is open, and that accommodates an object to be heated;
   a housing unit for the container, an upper surface of the housing unit being openable/closable with a lid;
   a discharge port that is disposed in an upper portion of a side wall of the housing unit, and that discharges air laterally toward an inside of the housing unit;
   an outlet port that is disposed in the housing unit, and through which air inside the housing flows out of the housing unit;
   an airflow duct that allows the outlet port and the discharge port to communicate with each other;
   an airflow fan that forces air flowing into the airflow duct to flow toward the discharge port;
   a heating unit that heats air flowing through the airflow duct; and
   an airflow guide panel that directs air discharged from the discharge port downward in the container,
   wherein the outlet port and the discharge port are in the sidewall of the housing unit, at the same height and adjacent to each other in a circumferential direction of the side wall.

2. The heating cooker according to claim 1, wherein the discharge port is disposed above an upper end of the container.

3. The heating cooker according to claim 1, wherein the outlet port is disposed above an upper end of the container.

4. The heating cooker according to claim 1, further comprising a stirrer unit that stirs the object to be heated.

* * * * *